Patented Nov. 9, 1937

2,098,429

UNITED STATES PATENT OFFICE 2,098,429

RUBBER COMPOUND

John D. Morron, Detroit, Mich., assignor to United States Rubber Products, Inc., New York, N. Y., a corporation of Delaware No Drawing. Application June 10, 1936, Serial No. 84,473

5 Claims. (Cl. 106—23)

This invention relates to an improved rubber composition, and in particular it relates to a hard rubber composition having incorporated therein wood charcoal.

In the production of hard rubber compositions it has been general practice to include in the compound a substantial quantity of hard rubber dust. The hard rubber dust in the compound functions as a filler, facilitates manipulation of the stock, and reduces cracking tendency after vulcanization. Fillers for this purpose are usually an inert material having no particular chemical function in the composition. It is essential, however, that such fillers have certain physical characteristics in order that they may be suitable for compounding of rubber.

Commercial whiting is frequently used as a filler. In hard rubber compositions the extent of the use of whiting is limited due to the tendency of the finished hard rubber article to crack.

I have found that wood charcoal may be used as a substitute for hard rubber dust in the manufacture of hard rubber articles, and that the use of wood charcoal has many advantages. For example, charcoal is an inexpensive material, and may be readily obtained in large quantities. Its physical properties make it suitable for compounding with rubber. Its light weight, compared with mineral fillers, results in a corresponding decrease in the weight of the finished article. It does not require any change in the conventional compounding and vulcanizing practice. In addition, the charcoal has a characteristic of absorbing and retaining gases produced by the rubber compound during vulcanization. Lamp black and gas black (carbon black) do not absorb gas as readily as charcoal and besides being more difficult to incorporate, have a greater tendency to mark.

In the practice of my invention, the charcoal should be of at least 260 mesh and usually 280–300 mesh, although I prefer to use charcoal powder of a fineness equivalent to about 300 mesh. I find that good results are obtained from many grades of commercial charcoal. Charcoal as used herein refers to the residuary product of the destructive distillation of vegetable matter and more particularly and preferably that originating from hard wood. It may be used broadly from 15 to 200% by weight based on the rubber.

In the conventional practice of compounding hard rubber, large quantities of hard rubber dust are included. For example, it has been customary to include 26 parts by weight of hard rubber dust in the rubber composition. In comparison, I find that in accordance with the practice of my invention, excellent results have been obtained by omitting the hard rubber dust and substituting charcoal therefor on the order of about 150% by weight based on the rubber. In the latter case, the charcoal functions as a substitute not only for the hard rubber dust, but also for a portion of other fillers such as whiting.

When it is considered that the cost of charcoal is about one-tenth of the cost of hard rubber dust, and when it is also considered that the charcoal forms a substantial volume of the entire compound, it is readily apparent that a substantial saving is effected without sacrificing the quality of the product.

Notwithstanding the advantages hereinabove described, actual tests have indicated that the use of charcoal in a hard rubber compound results in the production of an article equal to or better than hard rubber dust, as far as strength and cracking tendencies are concerned. Furthermore, a decided improvement in the appearance of a finished article incorporating the charcoal is noted.

During the vulcanization of hard rubber articles, certain gases are expelled from the compound, among which is hydrogen sulfide. These escaping gases frequently cause a porous condition in the hard rubber article, and in some cases cause blows in the rubber, resulting in imperfect exterior surfaces of the article.

Among the properties of charcoal as a filler is the characteristic of absorbing and retaining certain gases produced during vulcanization. In order to point out the ability of charcoal to absorb and retain gases, comparative tests were conducted in which samples of charcoal and hard rubber dust were enclosed in individual containers, including a piece of unvulcanized hard rubber stock. The containers were subjected to a temperature of 173 degrees centigrade for a period of two hours. It was found that the gas absorption of the charcoal was equivalent to 15.66 percent by weight, whereas the hard rubber dust indicated a gas absorption characteristic equal to 8.10 percent. Subsequently these same samples were re-heated in an oven for a period of two hours at 173 degrees centigrade to determine the gas retention characteristics of the samples. It was found that the ability of the charcoal to retain the absorbed gases was equivalent to 99.18 percent, whereas all of the gases absorbed by the hard rubber dust were dispelled.

Experiments which were conducted with other fillers such as whiting indicated that whiting does not absorb gas, but is simply an inert filler.

Due to the absorption qualities of charcoal, it is possible to produce a finished hard rubber article of uniform density, with a substantial reduction in the formation of imperfect articles.

The invention has special utility in the production of molded hard rubber steering wheels. For this purpose, a suitable steering wheel stock prior to molding and cure, is one containing by weight about 25% of rubber along with sulphur sufficient to form hard rubber, fillers such as whiting and carbon black, softener and accelerating ingredients, and in addition about 38% of wood charcoal.

From the foregoing description, the many advantages of the use of charcoal in a hard rubber composition become more obvious, and it should be understood that a portion of the various advantages of the invention may be attained by a partial use of charcoal as a substitute for other fillers.

By hard rubber is meant a rubber product having a sulphur vulcanization coefficient of at least 30, which means that the rubber is chemically combined with at least 30% by weight of sulphur based on the rubber.

While I have described certain preferred embodiments of my invention, it will be understood that the invention may be otherwise embodied without departing from the spirit thereof, or the scope of the appended claims.

Having thus described my invention, what I claim and desire to protect by Letters Patent is:

1. A vulcanized hard rubber product containing 15-200% by weight of charcoal and at least 30% by weight of sulphur based on the rubber.

2. A vulcanized hard rubber product containing wood charcoal on the order of about 150% by weight and at least 30% by weight of sulphur based on the rubber.

3. A vulcanizable rubber composition containing at least 30% by weight of sulphur to form a hard rubber product on cure and 15-200% by weight based on the rubber of wood charcoal of 280-300 mesh.

4. A molded vulcanized hard rubber product containing prior to cure, at least 30% by weight based on the rubber of sulphur and 15-200% by weight based on the rubber of wood charcoal of at least 260 mesh.

5. A steering wheel composed of vulcanized hard rubber containing at least 30% based on the rubber of sulphur and comprising on the order of about 150% by weight based on the rubber of wood charcoal.

JOHN D. MORRON.